United States Patent [19]

Pischinger

[11] Patent Number: 5,608,161
[45] Date of Patent: Mar. 4, 1997

[54] METHOD FOR DETERMINING THE COMBUSTION RATIO OF A RECIPROCATING-PISTON INTERNAL COMBUSTION ENGINE

[75] Inventor: Martin Pischinger, Aachen, Germany

[73] Assignee: FEV Motorentechnik GmbH & Co. Kommanditgesellschaft, Aachen, Germany

[21] Appl. No.: 433,428

[22] PCT Filed: Sep. 8, 1994

[86] PCT No.: PCT/EP94/03005

§ 371 Date: May 8, 1995

§ 102(e) Date: May 8, 1995

[87] PCT Pub. No.: WO95/07449

PCT Pub. Date: Mar. 16, 1995

[30] Foreign Application Priority Data

Sep. 8, 1993 [DE] Germany ............... 43 30 324.2

[51] Int. Cl.⁶ ............................................. G01M 15/00
[52] U.S. Cl. .................................. 73/117.3; 123/435
[58] Field of Search ....................... 73/116, 117.2, 73/117.3, 118.2; 123/435; 364/431.05

[56] References Cited

U.S. PATENT DOCUMENTS

| 4,788,854 | 12/1988 | Javaherian . | |
|---|---|---|---|
| 4,903,665 | 2/1990 | Washino et al. | 123/435 |
| 4,928,653 | 5/1990 | Ohkubo et al. | 123/435 |
| 4,962,739 | 10/1990 | Wataya | 123/435 |
| 4,996,960 | 3/1991 | Nishiyama et al. | 123/435 |
| 5,038,737 | 8/1991 | Nishiyama et al. | 123/435 |
| 5,067,460 | 11/1991 | Van Duyne | 123/435 |
| 5,474,045 | 12/1995 | Demizu et al. | 123/435 |

FOREIGN PATENT DOCUMENTS

| 6155349 | 3/1986 | Japan . |
|---|---|---|
| 2149535 | 6/1985 | United Kingdom . |
| 2210180 | 6/1989 | United Kingdom . |

OTHER PUBLICATIONS

R. A. Fiorini: "A/F Estimation from Internal Combustion Engine Cylinder Pressure Using Fast Fourier Transform Descriptors". In:Proceedings of the 1988 American Control Conference, vol. 3, Jun. 15, 1988, pp. 2392–2400.

Y. Hata et al."Engine control system using a cylinder pressure sensor". IN: IEE Proceedings D. Control Theory & Applications, vol. 136, No. 2, Mar. 1989, Stevenage GB, pp. 84–88.

*Primary Examiner*—Richard Chilcot
*Assistant Examiner*—Eric S. McCall
*Attorney, Agent, or Firm*—Spencer & Frank

[57] ABSTRACT

A method of determining a combustion air ratio of a reciprocating-piston internal combustion engine includes the steps of measuring a gradient of a combustion chamber pressure as a function of a position of a piston in a piston cylinder, for at least one operating cycle of the engine. Measured signals are formed representing the gradient of the combustion chamber pressure. The measured signals are digitized and entered into a programmed evaluation unit, where they are evaluated on the premise that energy prior to combustion and energy following or toward the end of combustion are at least approximately equal. Further, they are evaluated based on the equation $$u_{BrEnd} = \frac{1}{m} \cdot \left( U_{ZZP} - \int_{ZZP}^{BrEnd} p\, dV + \int_{ZZP}^{BrEnd} dQ_{Wand} + \int_{ZZP}^{BrEnd} h \cdot dm_{BlowBy} \right)$$

A value of the combustion air ratio is calculated from the evaluated digitized measured signals in an iterative computation process, and the value is displayed.

8 Claims, 2 Drawing Sheets ns5,608,161

METHOD FOR DETERMINING THE COMBUSTION RATIO OF A RECIPROCATING-PISTON INTERNAL COMBUSTION ENGINE

BACKGROUND OF THE INVENTION

The invention relates to a method of determining the combustion air ratio $\lambda$ (which is the ratio of the quantity of air supplied, to the minimum quantity of air required for the combustion of one unit of quantity of fuel) of a reciprocating-piston internal combustion engine, particularly an Otto engine.

The methods used at this time to determine the combustion air ratio $\lambda$ in reciprocating-piston internal combustion engines are based on the determination of the air mass, and the fuel mass, or an evaluation of the chemical composition of the exhaust gas. The disadvantage of these methods is that an exact determination of the combustion air ratio cannot be performed for individual operating cycles, particularly at higher engine rpms. In measurement processes employing a so-called leanness sensor, the problem arises of the considerable temperature dependency of this type of sensor, which leads to erroneous measurements without extensive temperature compensation. Moreover, with the aid of a lambda sensor measurement or leanness sensor measurement, ultimately only averaged values can be detected which may still be sufficient for the regulations and/or controls of the fuel supply system of an internal combustion engine. With the aid of a lambda sensor measurement or leanness sensor measurement, however, it is possible to make more precise statements about the operating-cycle-specific combustion air ratio as a function of the combustion process, which is necessary in particular for the optimization of aggregates as a whole, i.e., reciprocating-piston internal combustion engines, including the aggregates needed for regulation and control.

SUMMARY OF THE INVENTION

The object of the invention is to create a method that permits the determination of the combustion air ratio $\lambda$ for individual operating cycles.

In the method of the invention, the gradient of the combustion chamber pressure is measured, as a function of the position of the piston in the cylinder, for at least one operating cycle, and the measured signals that represent the gradient of the combustion chamber pressure are digitized, and the digitized measured signals are entered into a programmed evaluation unit in which the value of the combustion air ratio is calculated from the measured gradient of the combustion chamber pressure in an iterative computational process, and the result of calculation is outputted. The basis of evaluation in the evaluation unit is the rule that the energy prior to combustion and the energy following or toward the end of combustion are identical, or at least nearly identical.

DETAILED DESCRIPTION OF THE INVENTION

Figure 1:
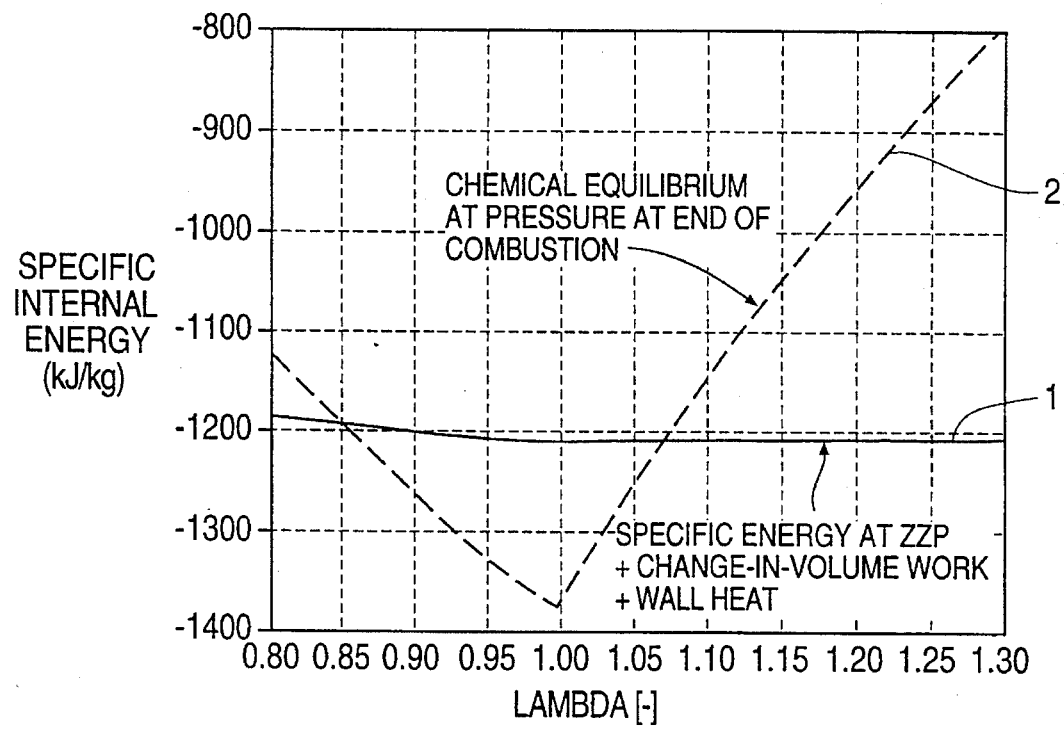
FIG. 1 illustrates two graphical curves of an equation utilized by the present invention.

Evaluation preferably takes place based on the following equation:

$$u_{BrEnd} = \frac{1}{m} \cdot \left\{ U_{ZZP} - \int_{ZZP}^{BrEnd} p \, dV + \int_{ZZP}^{BrEnd} dQ_{Wand} + \int_{ZZP}^{BrEnd} h \cdot dm_{BlowBy} \right\} \quad (1-1)$$

In a useful embodiment, at least one distinction parameter, particularly the distinction parameter of "rich/lean," is additionally entered into the evaluation unit in order to eliminate ambiguity. It is especially advantageous when at least one distinction parameter derived from the measurement of the gradient of the combustion chamber pressure is entered into the evaluation unit.

The method of the invention permits the determination of the combustion air ratio $\lambda$, independently of the rpm of the engine, for individual operating cycles. An assumption of the invention is that, by means of combustion, the chemical energy level of the gas mixture in the cylinder decreases, and the energy is released as change-in-volume work and wall heat. This conservation of energy is described by Equation 1.1 for the phase from the time of ignition to the end of combustion, where

| | | |
|---|---|---|
| $u_{BrEnd}$ | specific energy at end of combustion | [J/kg] |
| m | gas mass in combustion chamber at end of combustion | [kg] |
| $U_{ZZP}$ | energy at time of ignition | [J] |
| p | pressure in combustion chamber | [N/m$^2$] |
| dV | change in volume of combustion chamber | [m$^3$] |
| $dQ_{Wand}$ | wall heat | [J] |
| h | specific enthalpy of gas | [J/kg] |
| $dm_{Blowby}$ | leakage mass flowing past piston | [kg] |

Practical tests have shown that one can assume as a prerequisite that the mixture combusts completely until the outlet valve opens. It can be further assumed that the gas mixture is homogeneous at the end of combustion, that is, the time at which the outlet valve opens.

Because the engine is known with respect to its dimensions, particularly regarding volume, the gas mass can be determined by a calculation of a charge change. Because the pressure at the end of combustion, that is, the time "outlet opens," is present as a measured value, the specific internal energy $U_{brEnd}$ can be determined for this time as a function of the combustion air ratio, which will be explained in detail below.

The internal energy at the time of ignition $U_{ZZP}$ is only slightly dependent on $\lambda$. At the time of ignition, a known mixture of fresh mixture and residual gas is present. Again, mass and pressure are known, so they can be determined as a function of $\lambda$.

The values considered to be a loss factor $$\int_{ZZP}^{BrEnd} dQ_{wand} \text{ and } \int_{ZZP}^{BrEnd} h \cdot dm_{BlowBy}$$

are essentially formed by wall heat losses that can be used based on available approximation formulas, and also by the so-called leakage mass (Blow by), whose influence on the energy state is, however, so slight that this component can be disregarded.

Because $U_{BrEnd}$, on the one hand, and $U_{ZZP}$, on the other, are functions of the combustion air ratio $\lambda$, the following Equation 1.2 is to be solved in the evaluation unit:

$$\frac{1}{m} \cdot \left( U_{ZZP} - \int_{ZZP}^{BrEnd} p \, dV + \int_{ZZP}^{BrEnd} dQ_{Wand} + \int_{ZZP}^{BrEnd} h \cdot dm_{BlowBy} \right) - u_{BrEnd} = 0 \quad (1.2)$$

This equation system to be solved is represented in FIG. 1. Curve 1 shows the right portion of Equation 1.1, which is only slightly dependent on $\lambda$. Curve 2 shows the left portion of Equation 1.1, i.e., the chemical equilibrium at the pressure at the end of combustion. From this it can be seen that the two points of intersection between curves 1 and 2 represent possible solutions of Equation 1.2.

Since it is improbable that the lambda sensor measurement will determine the exact value, the evaluation unit is programmed so that it predetermines a new $\lambda$ value, and the calculation process is repeated with the new predetermined $\lambda$ value until the result predetermined by Equation 1.1 or Equation 1.2, that is, the points of intersection of curves 1 and 2 in FIG. 1, has been reached. The $\lambda$ value that has led to the solution of the equation is then displayed.

The two solutions can also be found with the aid of a combustion function calculation, in which instance the combustion function indicates the ratio of the combusted fuel mass to the entire fuel mass used, with $$X_{Bre} = \frac{m_{Br}, \text{combusted}}{m_{Br}} = 2.1$$

Because complete combustion is a prerequisite here, the combustion function must reach the value 1 at the end of combustion. The end value of the combustion function is a function of $\lambda$. Again, the two solutions of $\lambda$ can be found iteratively.

As can be seen from FIG. 1, for an Otto engine, a solution results for both a rich mixture ($\lambda<1$) and a lean mixture ($\lambda>1$). It is possible in principle to predetermine an additional measured value, for example the measurement of the $\lambda$ value, by way of a lambda sensor in order to select the correct solution. However, when rapid $\lambda$ changes occur, a not inconsiderable danger of an erroneous solution is possible, because the sensor output signal cannot be allocated exactly to an operating cycle.

It is, however, particularly advisable to perform the method without additional measured values, such as lambda sensor signals, in which case the distinction parameter of rich/lean is likewise derived from the measured pressure gradient per operating cycle. It has proven useful to enter into the evaluation unit at least one distinction parameter derived from the gradient of the combustion chamber pressure. The following parameters, which can be derived from the gradient of the combustion chamber pressure, are considered as distinction parameters: the combustion delay, the length of combustion, the speed of combustion and the indicated average pressure.

The combustion delay is defined as the time between ignition and the first detectable increase in pressure due to combustion. The point of this pressure increase can be determined through calculation and evaluation of a combustion function. Because the pressure gradient can be afflicted with small interferences, small fluctuations can occur in the combustion function. Therefore, in determining the combustion delay, it is advisable to select the point at which a threshold value greater than the fluctuation is exceeded. In most instances, the 2- or 5-percentage point of the combustion function is selected.

The length of combustion indicates the period between the time of ignition and the end of combustion. Determination of the end of combustion can be effected analogously to the determination of the beginning of combustion, i.e., the point at which a threshold value of the combustion function is exceeded is determined (e.g. 95%, 98%). It is also conceivable to determine the point as of which the combustion function no longer changes, or reaches its maximum value. The effective length of combustion is defined as the time between the beginning and end of combustion.

Figure 2:
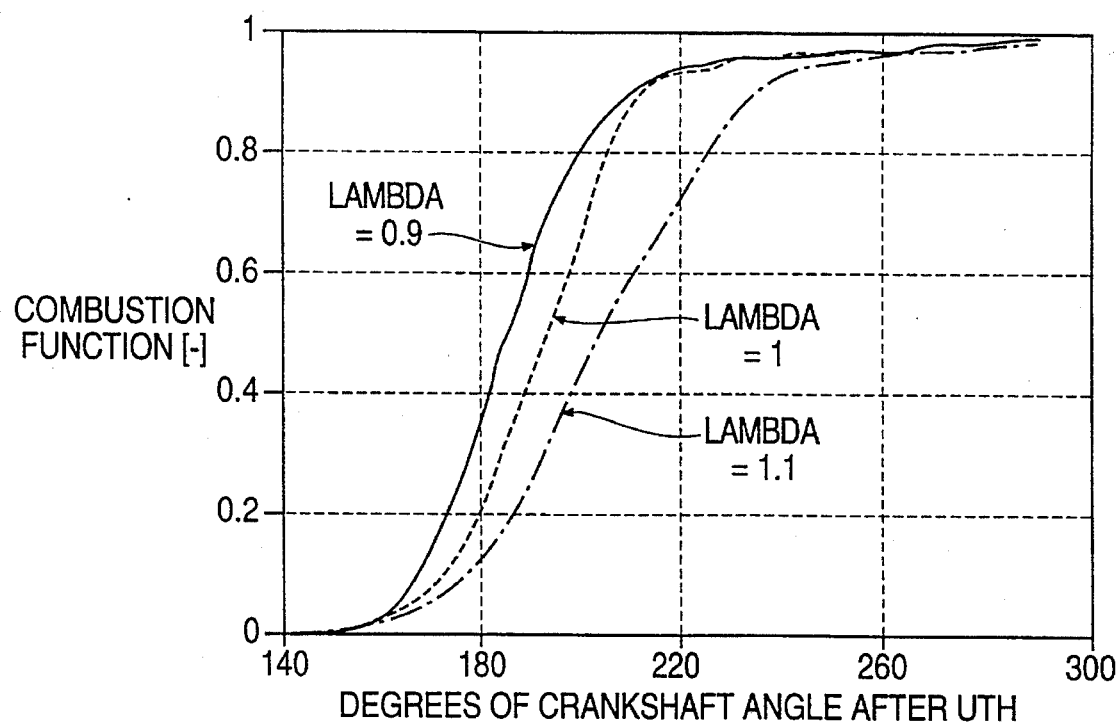
FIG. 2 is a graphical representation of a typical dependency of the course of a combustion function on the combustion air ratio.

The typical dependency of the course of the combustion function on the combustion air ratio is shown in FIG. 2. With increasing leanness, the combustion delay and effective length of combustion increase.

The combustion speed is defined as the following:

$$s_{Bre} = \frac{\dot{m}_2}{\rho 1 \cdot A_{Flamfr}} \quad \text{with} \quad \dot{m}_2 = \dot{\chi}_{Bre} \cdot m$$

| | | |
|---|---|---|
| m | total mass | [kg] |
| $s_{Bre}$ | combustion speed | [m/sec] |
| $\dot{\chi}_{Bre}$ | derivation of combustion function according to time | [1/sec] |
| $\rho_1$ | density of zone 1 | [kg/m³] |
| $A_{Flamfr}$ | surface of flame front | [m²] |
| $\dot{m}_2$ | derivation of masses in zone 2 according to time | [kg/sec] |

Equation 1.3 is proposed for calculating a characteristic value from the course of the combustion speed. With this equation, the combustion speed is weighted with the mass conversion, which reduces the influence of the local $\lambda$ non-homogeneity.

$$\overline{s}_{Bre} = \frac{\Sigma[\dot{m}_2(\alpha) \cdot s_{Bre}(\alpha)]}{\Sigma \dot{m}(\alpha)} = \Sigma[d\chi_{Bre}(\alpha) \cdot s_{Bre}(\alpha)] \quad (1.3)$$

The unit of this weighted combustion speed is (m/sec). After determination of the value $S_{Bre,söch}$, in stoichiometric combustion of averaged pressure gradients, it can be assessed whether a rich or lean cycle is present.

Figure 3:
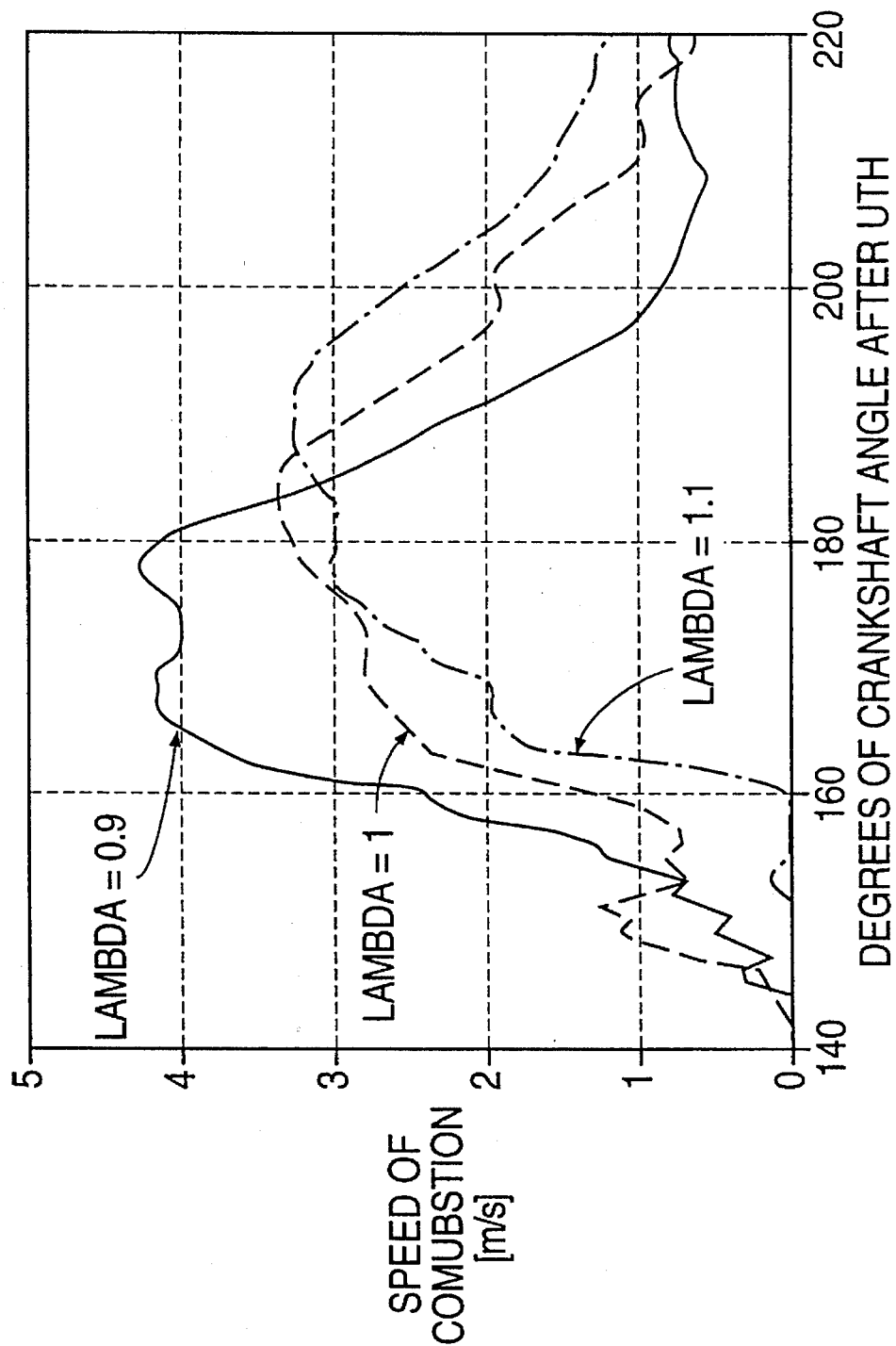
FIG. 3 is a graphical representation of individual, typical operating cycles in which the average combustion ratio is varied.

$\overline{S}_{Bre} > \overline{S}_{Brestöch} \rightarrow$ rich $\overline{S}_{Bre} < \overline{S}_{Brestöch} \rightarrow$ lean The known tendency of richer operation to lead to higher combustion speeds can clearly be seen in a comparison of pressure gradients that were respectively averaged over 100 operating cycles, and in which the average combustion ratio was varied. FIG. 3 shows this connection for individual, typical operating cycles. Attempts to apply this statement generally to individual operating cycles often lead to contradictions.

Because of these contradictions, the combustion speed course obtained from the pressure gradient cannot be used in principle as the sole criterion for the rich/lean decision in individual cycles.

The indicated average pressure represents the change-in-volume work of an operating cycle related to the stroke volume:

$$p_{mi} = \frac{\int_{\alpha=0}^{360/i} p\, dV}{V_h}$$

four-stroke engine: $i = 0.5$ two-cycle engine: $i = 1$

The energy analysis shows that the combustion energy made available by the fresh mixture has its maximum fairly precisely in the stoichiometric air ratio. Despite this, the output of an engine can be increased when the mixture is enriched, that is, if driving takes place when λ is less than 1. This phenomenon can be attributed to two effects. First, in an Otto engine, more intense cooling is effected by the greater fuel vaporization of the fresh mixture. Thus, more fresh mixture mass travels into the cylinder per operating cycle. Secondly, the high-pressure process is also influenced, which can be explained by a process calculation and analysis. In a comparison of the combustion function course of a rich operating cycle with that of a stoichiometric operating cycle, it can be seen that more rapid combustion takes place in the rich operating cycle. The comparison processes will be examined here in order to explain how shorter combustion can effect the output work. If the thermal losses are disregarded, an abrupt combustion at upper (top) dead center corresponds to the constant volume cycle. Constant-pressure combustion, for example, can be realized through a controlled, slower combustion. An increasingly faster combustion consequently more and more closely approaches the constant volume cycle, which represents the most thermodynamically favorable process. For performing an adiabatic process, more work is performed with faster combustion and uniform energy supply. These explanations for the adiabatic process also apply analogously for the process with heat transfer.

To summarize, it can be stressed that, on the average, a richer operating cycle leads to faster combustion and thus to a higher indicated average pressure $P_{mi}$. The measurements were able to corroborate this effect. In individual operating cycles, however, the cyclical fluctuations of other influential variables become more noticeable, which impedes a reliable rich/lean decision based on $P_{mi}$.

The above remarks show that the disclosed criteria for the rich/lean decision can lead to the correct rich/lean decision, but have a very high error quota when applied individually. Therefore, it is advisable to use the individual criteria in combination in order to obtain a reliable overall criterion.

If the evaluation unit is provided with a so-called fuzzy logic, the individual criteria discussed above, namely combustion delay, length of combustion, indicated average pressure and combustion speed, can be used as so-called fuzzy variables. The rich/lean decision can be made based on the combination of fuzzy variables, because the individual criteria are interfered with in different ways by the cyclical fluctuations of other influential variables, so the combined criterion is more reliable than the respective individual criteria.

The determination of the specific energy $U_{ZZP}$ and $U_{BreEnd}$ is known in principle, but the way in which it can be used in programming the evaluation unit is reiterated in a summarizing representation below. Equations (5) and (31) show the internal energy $U_{BreEnd}$, on the one hand, and $U_{ZZP}$, on the other, as a function of λ. The determination can, however, also take place with the use of approximation formulas in order to achieve speed-related advantages.

The above-described measuring method for deriving the combustion air ratio λ from the measured gradient of the combustion chamber pressure results in the possibility of determining the combustion air ratio λ for an individual operating cycle. In corresponding storage of the measured values of a plurality of temporally successive operating cycles, in which the measured values of a plurality of directly consecutive operating cycles can be measured and stored and subsequently evaluated successively, it is possible not only to determine the combustion air ratio λ for the different, stationary operating states, but also to determine dynamic operating states, for example even in accelerations or delays. Since no additional outlay for measuring technology is necessary in engine test stands that are already equipped with the indicating apparatuses for measuring the pressure gradient as a function of the piston position, the method of the invention represents a good option of investigating the influences of the peripheral aggregates in a predetermined engine construction, for instance the influences of the individual components of mixture preparation, such as geometry and/or temperature conditions in the intake conduit, nozzle arrangement, nozzle shape, etc. Because the determined value of the combustion air ratio, including the distinction criteria for the evaluation unit, is derived from the gradient of the combustion chamber pressure during one operating cycle, the possibility essentially exists of also using the determined value of the combustion air ratio as a setting signal for control or regulation in the region of the fuel supply of the engine.

For determining the specific energy at the time of ignition and the end of combustion, the following calculations are to be performed with a given λ value and a known fuel composition; the result of these calculations is then entered into the evaluation unit as the basis for the calculation process according to Equations 1.1 and 1.2, so that, starting at the measured pressure gradient, the measurement or determination of the λ value can be effected for one operating cycle.

In addition to the use for developmental work λ on the engine, this type of control or regulation can be used in mass-produced automobiles. Hence, unlike in conventional λ regulation, a very quick λ reaction to a change in λ takes place, for example particularly in unstable operation. To achieve the highest possible utilization of the catalytic converter, the individual cycles are not necessarily pilot-controlled; rather, the history is taken into consideration and an integral value of λ=1 is sought (storage effect of the catalytic converter).

A further improvement in the λ value of individual cycles can be achieved when the actual λ value of an operating cycle, or the deviation from the pilot control value, is registered (=stored) as a function of the respective operating state (e.g. characterized by rpm, load and/or dynamic parameters). When this operating state recurs, the associated registered value of the λ deviation in pilot control can be taken into consideration. A qualitatively high-value pilot control can be achieved with this adaptive method.

Disclosed below is an option of determining the energy necessary for evaluation at the time of ignition and the end of combustion.

PROCEDURE FOR DETERMINING THE SPECIFIC ENERGY AT THE TIME OF IGNITION AND THE END OF COMBUSTION

1. Determination of the fuel composition:

$$\sigma_i = \frac{n_i}{m} = f(\lambda) \tag{1}$$

2. Determination of the gas constant:

$$R = \Sigma \sigma_i \cdot R_m \tag{2}$$

3. Determination of the temperature:

$$T = \frac{p \cdot V}{R \cdot m} \tag{3}$$

4. Determination of the specific energy:

$$u = \Sigma \sigma_i \cdot h_{m_i}^\circ(T) - R \cdot T \tag{4}$$

$h_{m_i}^\circ(T)$: present as a table for each fuel constituent

1. Determination of the material composition

The material composition of a mixture is described unambiguously by the specific quantities $\sigma_i$ of the individual constituents i. The following constituents i are taken into consideration: $CO_2$, $CO$, $H_2O$, $O_2$, $N_2$, $H_2$ and fuel.

1.1 Composition of the gas at the end of combustion as a function of $\lambda$

To determine the exhaust gas composition, the fresh mixture, including the fuel, is formally divided into the constituents C, $H_2$, $N_2$, $O_2$ and $H_2O$. In a diesel engine, fuel must additionally be considered as the initial fuel composition for the reaction. Therefore, no distinction exists between a diesel engine and an Otto engine. Since the fuel was formally divided into its constituents, this initial fuel composition cannot be used to calculate energies or enthalpies of the mixture. As a distinction from the fresh mixture, the index "1" is used below instead of "FG." The combustion products are assigned the index "2," and can be used to calculate the mixture enthalpy and energy. The mass remains constant during combustion, that is, $m_1$ is equal to $m_2$. The Blow-By losses are insignificant for the observation of the chemical composition.

$$\frac{m_{FL}}{m_1} = \frac{1}{1 + \frac{1 - \chi_{H_2O}}{\lambda \cdot L_{ST}}} \tag{5}$$

$$\sigma_{1,H_2O} = \frac{m_{FL}}{m_1} \cdot \frac{\chi_{H_2O}}{M_{H_2O}} \tag{6}$$

$$\sigma_{1,N_2} = \frac{m_{FL}}{m_1} \cdot (1 - \chi_{H_2O}) \cdot \frac{0.7671}{M_{N_2}} \tag{7}$$

| | | |
|---|---|---|
| c | mass proportion of carbon in fuel | [—] |
| h | mass proportion of hydrogen in fuel | [—] |
| o | mass proportion of oxygen in fuel | [—] |
| $m_{FL}$ | mass of moist air | [kg] |
| $M_i$ | mol mass of constituent i | [kg/mol] |
| $\chi_{H2O}$ | mass proportion of water in air | [—] |
| $L_{ST}$ | stoichiometric combustion air ratio | [—] |
| $m_{Br}$ | fuel mass | [kg] |

$$\frac{m_{Br}}{m_1} = \frac{1 - \chi_{H_2O}}{\lambda \cdot L_{ST} + 1 - \chi_{H_2O}} \tag{8}$$

$$\sigma_{1,c} = \frac{m_{Br}}{m_1} \cdot \frac{c}{M_c} \tag{9}$$

$$\sigma_{1,H_2} = \frac{m_{Br}}{m_1} \cdot \frac{h}{M_{H_2}} \tag{10}$$

$$\sigma_{1,O_2} = \frac{m_{FL}}{m_1} \cdot (1 - \chi_{H_2O}) \cdot \frac{0.2329}{M_{O_2}} + \frac{m_{Br}}{m_1} \cdot \frac{o}{M_{Br}} \tag{11}$$

In formulas 7 and 11, the mass proportions of the nitrogen and oxygen in dry air are assumed to be $\xi_{N2}=0.7671$ and $\xi_{o2}=0.2329$. The base material balance states that the number of molecules of a base material remains constant in a chemical reaction. Since the mass likewise remains constant, the specific quantities must also remain constant. It has proven useful to make the following three case distinctions to calculate the composition:

1.1a) Combustion air ratio $\lambda \geq 1$

For the sake of simplicity, it is assumed for this case that no carbon monoxide is present in the combustion product.

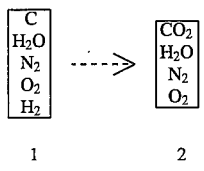

Base material balance $$C: \sigma_{2,CO_2} = \sigma_{1,C} \tag{12}$$

$$H: \sigma_{2,H_2O} = \sigma_{1,H_2O} + \sigma_{1,H_2} \tag{13}$$

$$N: \sigma_{2,N_2} = \sigma_{1,N_2} \tag{14}$$

$$O: \sigma_{2,O_2} = \sigma_{1,O_2} - \sigma_{1,C} - \tfrac{1}{2} \cdot \sigma_{1,H_2} \tag{15}$$

1.1b) Combustion air ratio $\lambda < 1$ and fuel containing a proportion of C

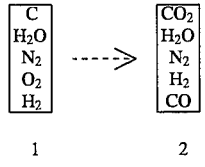

For a fresh gas mix having a fuel that contains C and in which $\lambda < 1$, the water-gas equilibrium is assumed in order to obtain, in addition to the four base material balance equations, a further equation for the fifth constituent of the exhaust gas. This equilibrium constant is only dependent on the temperature of the mixture.

$$K(T) = \frac{\sigma_{2,CO_2} \cdot \sigma_{2,H_2}}{\sigma_{2,CO} \cdot \sigma_{2,H_2O}} \tag{16}$$

For the exhaust gas composition, the equilibrium constant is usually set at 1750K (transformation temperature)

$$K(1750) = 0.2773$$

The solution of the equation system leads to the following solution for the specific quantities of the combusted substance:

$$\sigma_{2,H_2O} = S_1 - \sqrt{(S_1^2 - S_2)} \tag{17}$$

with $$S_1 = \frac{1}{2} \frac{1}{1-K} (\sigma_{1,H_2O} \cdot (2-K) + 2\sigma_{1,O_2} \cdot \tag{18}$$

$$(1-K)\sigma_{1,H_2} + \sigma_{1,c} \cdot (2K-1))$$

and $$S_2 = \frac{1}{1-K} \cdot (\sigma_{1,H_2O} + \sigma_{1,H_2}) \cdot (\sigma_{1,H_2O} + 2\sigma_{1,O_2} - \sigma_{1,c}) \tag{19}$$

$$\sigma_{2,N_2} = \sigma_{1,N_2} \tag{20}$$

$$\sigma_{2,H_2} = \sigma_{1,H_2} - \sigma_{2,H_2O} + \sigma_{1,H_2O} \tag{21}$$

$$\sigma_{2,CO_2} = 2\sigma_{1,O_2} - \sigma_{2,H_2O} - \sigma_{1,c} + \sigma_{1,H_2O} \tag{22}$$

$$\sigma_{2,CO} = \sigma_{1,c} - \sigma_{2,CO_2} \tag{23}$$

1.1.c) Fuel without a proportion of C

This case applies to, for example, pure hydrogen combustion.

$$\begin{bmatrix} H_2O \\ N_2 \\ O_2 \\ H_2 \end{bmatrix} \quad \dashrightarrow \quad \begin{bmatrix} H_2O \\ N_2 \\ H_2 \end{bmatrix}$$

$$\qquad 1 \qquad\qquad\qquad 2$$

$$\sigma_{2,N_2} = \sigma_{1,N_2} \tag{24}$$

The following equations apply for $\lambda \geq 1$:

$$\sigma_{2,H_2O} = \sigma_{1,H_2O} + \sigma_{1,H_2} \tag{25}$$

$$\sigma_{2,O_2} = \sigma_{1,O_2} - \tfrac{1}{2} \cdot \sigma_{1,H_2} \tag{26}$$

$$\sigma_{2,H_2} = 0 \tag{27}$$

The following equations apply for $\lambda < 1$:

$$\sigma_{2,H_2O} = 2\sigma_{1,O_2} + \sigma_{1,H_2O} \tag{28}$$

$$\sigma_{2,H_2} = \sigma_{1,H_2} - 2\sigma_{1,O_2} \tag{29}$$

$$\sigma_{2,O_2} = 0 \tag{30}$$

1.2 Composition during compression

In a diesel engine, the mixture comprises moist air and residual gas during the compression phase, whereas the mixture of the Otto engine additionally contains fuel.

| | | |
|---|---|---|
| $m_{FL}$ | mass of moist air | [kg] |
| $m_{FG}$ | mass of fresh mixture | [kg] |
| $\sigma_{FG,i}$ | specific material quantity of the constituent i in the fresh mixture | [kmol/kg] |
| $M_i$ | mol mass of the constituent i | [kg/kmol] |
| $\chi_{H_2O}$ | mass proportion of water in the air | [—] |
| $L_{ST}$ | stoichiometric combustion air ratio | [—] |

$$\text{Otto engine:} \quad \frac{m_{FL}}{m_{FG}} = \frac{1}{1 + \frac{1 - \chi_{H_2O}}{\lambda \cdot L_{ST}}} \tag{31}$$

$$\text{Diesel engine:} \quad \frac{m_{FL}}{m_{FG}} = 1$$

$$\sigma_{FG,H_2O} = \frac{m_{FL}}{m_{FG}} \cdot \frac{\chi_{H_2O}}{M_{H_2O}} \tag{32}$$

$$\sigma_{FG,N_2} = \frac{m_{FL}}{n_{FG}} \cdot (1 - \chi_{H_2O}) \cdot \frac{0.7671}{M_{N_2}} \tag{33}$$

In formulas 33 and 34, the mass proportions of nitrogen and oxygen, $$\sigma_{FG,O_2} = \frac{m_{FL}}{n_{FG}} \cdot (1 - \chi_{H_2O}) \cdot \frac{0.2329}{M_{O_2}} \tag{34}$$

are assumed to be $\xi_{N2} = 0.7671$ and $\xi_{o2} = 0.2329$ in dry air.

$$\text{Otto engine:} \quad \sigma_{FG,Br} = \frac{m_{FL}}{m_{FG}} \cdot \frac{1 - \chi_{H_2O}}{\lambda \cdot L_{ST}} \cdot \frac{1}{M_{Br}} \tag{35}$$

$$\text{Diesel engine:} \quad \sigma_{FG,Br} = 0$$

The remaining specific material quantities of $CO_2$, $H_2$ and CO are zero in the fresh mixture. During the compression phase, the mixture comprises a fresh mixture and residual gas. The specific material quantities of the mixture constituents during the compression phase are calculated according to formula 36:

$$\sigma_{Kompr.,i} = \sigma_{Fg,i} \cdot (1 - \xi_{RG}) + \sigma_{2,i} \cdot \xi_{RG} \tag{36}$$

$\xi_{RG}$ residual gas proportion during compression [—]

I claim:

1. A method of determining a combustion air ratio of a reciprocating-piston internal combustion engine, comprising the steps of:

measuring a gradient of a combustion chamber pressure as a function of a position of a piston in a piston cylinder, for at least one operating cycle of the engine;

forming measured signals representing the gradient of the combustion chamber pressure;

digitizing the measured signals;

entering the digitized measured signal into a programmed evaluation unit;

evaluating the digitized measured signals in the programmed evaluation unit on the premise that energy prior to combustion and energy following or toward the end of combustion are at least approximately equal, and based on the equation $$u_{BrEnd} = \frac{1}{m} \cdot \left( U_{ZZP} - \int_{ZZP}^{BrEnd} p \, dV + \int_{ZZP}^{BrEnd} dQ_{Wand} + \int_{ZZP}^{BrEnd} h \cdot dm_{BlowBy} \right)$$

calculating a value of the combustion air ratio from the evaluated digitized measured signals in an iterative computation process; and displaying the value.

2. The method defined in claim 1, wherein the engine is an Otto engine.

3. The method defined in claim 1, wherein said entering step further includes entering at least one distinction parameter into the evaluation unit in order to eliminate ambiguity.

4. The method defined in claim 3, wherein the distinction parameter is a "rich/lean" distinction parameter.

5. The method defined in claim 1, wherein said entering step further includes entering at least one distinction parameter derived from said measuring step into the evaluation unit.

6. The method defined in claim 1, wherein said measuring step includes measuring the gradient of the combustion chamber pressure of a plurality of temporally successive operating cycles; further comprising the step of storing the measured gradients; and wherein said evaluating step includes successively evaluating the stored measured gradients.

7. The method defined in claim 1, further comprising the step of using the value of the combustion air ratio as a setting signal for control or regulation in a region of a fuel supply of the engine.

8. The method defined in claim 7, further comprising the step of storing the value of the combustion air ratio or a deviation from a nominal value of the combustion air ratio, together with an operating state of the engine; and, when the operating state recurs, evaluating the stored value for corrective purposes in pilot control.

* * * * *